Aug. 17, 1965  J. R. DICKINSON  3,201,318
REACTOR WITH TUBES DISPLACED FROM CORE AXES
Filed July 8, 1963  5 Sheets-Sheet 1
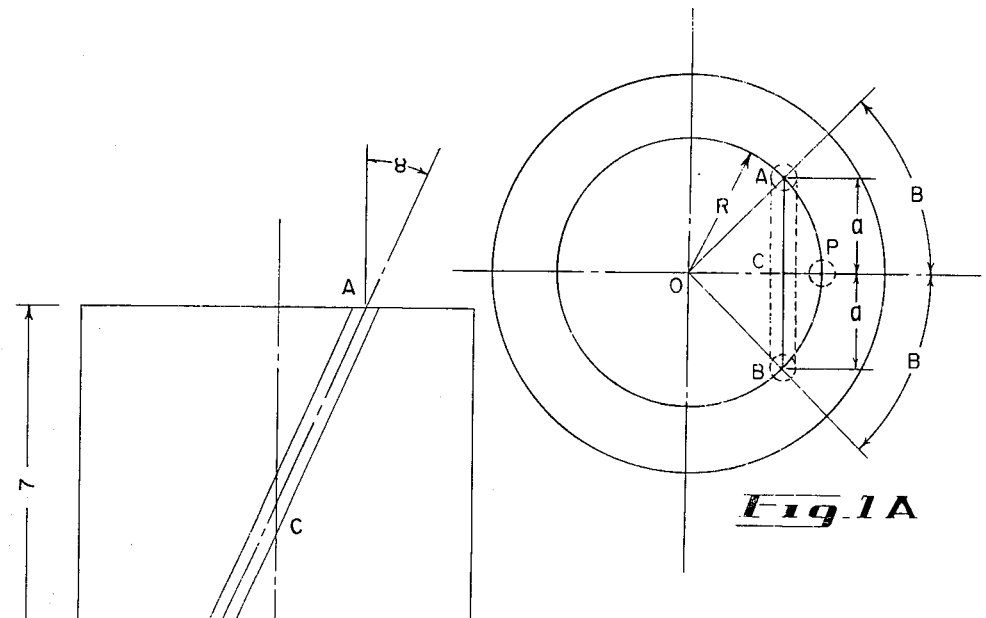
Fig.1A
Fig.1B
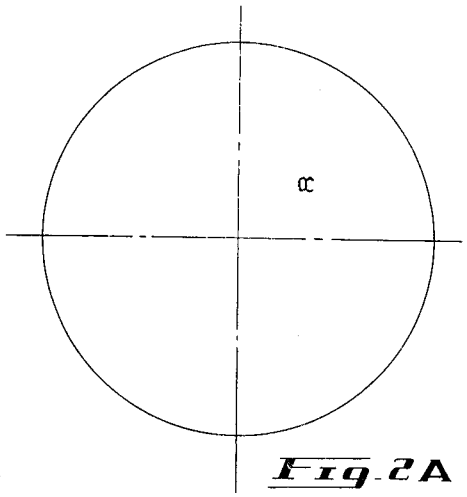
Fig.2A
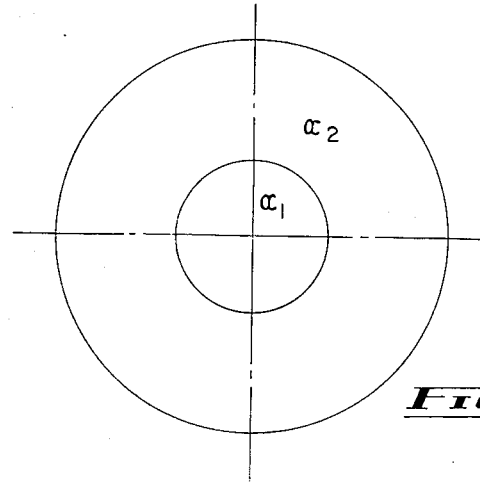
Fig.2B
Inventor
John R. Dickinson
Shlesinger, Shlesinger &
Arkwright
Attorneys Aug. 17, 1965   J. R. DICKINSON   3,201,318
REACTOR WITH TUBES DISPLACED FROM CORE AXES
Filed July 8, 1963   5 Sheets-Sheet 2

Inventor
John R. Dickinson
Shlesinger, Shlesinger & Arkwright
attorneys

Aug. 17, 1965  J. R. DICKINSON  3,201,318
REACTOR WITH TUBES DISPLACED FROM CORE AXES
Filed July 8, 1963  5 Sheets-Sheet 3

Inventor
John R. Dickinson
Shlesinger, Shlesinger & Arkwright
Attorneys

Aug. 17, 1965　　　J. R. DICKINSON　　　3,201,318
REACTOR WITH TUBES DISPLACED FROM CORE AXES
Filed July 8, 1963　　　　　　　　　　　　　　　　5 Sheets-Sheet 5

Inventor
John R. Dickinson

United States Patent Office 3,201,318
Patented Aug. 17, 1965

3,201,318
REACTOR WITH TUBES DISPLACED
FROM CORE AXES
John R. Dickinson, Peterborough, Ontario, Canada, assignor to Atomic Energy of Canada Limited, Ottawa, Ontario, Canada, a corporation
Filed July 8, 1963, Ser. No. 293,385
13 Claims. (Cl. 176—30)

The present invention relates to a fuel channel lattice for the core of a nuclear reactor and in particular to a fuel channel lattice wherein the fuel channels are skewed at an angle to the axis of the reactor core.

The cores of heterogeneous nuclear reactors are commonly designed to a shape which is approximately a right circular cylinder. Through this core, straight fuel channels run from end to end. For mechanical design reasons, these channels are usually run parallel to the axis of the core in a square or triangular lattice array of uniform pitch. This arrangement of fuel channels does not give the most efficient operation of the nuclear reactor since the neutron flux density is not uniform throughout the reactor core. The flux density at the central portion of the core being greater than the flux density in the outer part of the core.

For the best performance from a power reactor, however, it is preferable to space the channels more densely in the center than in the outer part of the core. Such an arrangement gives a flattened neutron flux and therefore a more uniform thermal power production in the core. Flattening the neutron flux by spacing the fuel more densely in the center also gives a higher conversion rate of fertile material to fissile material, thus enhancing the long term fuel burnup characteristics of the reactor. Accordingly, it would appear desirable to form the lattice of a nuclear reactor core with a non-uniform spacing of the fuel channels so that the maximum operating efficiency is obtained. However, there are disadvantages in a non-uniform spacing of the fuel channels in a nuclear reactor which have, up to the present, prevented the adoption of non-uniform spacing. Such disadvantages include mechanical difficulties such as the manufacturing of end fittings for the fuel channels and in carrying coolant to and from each channel. But primarily, the disadvantage of a non-uniform fuel channel lattice is the difficulty in changing fuel elements in the lattice.

In an attempt to overcome this difficulty, a nuclear reactor was constructed in which a uniform lattice arrangement was chosen for the upper and lower ends of the core and one lattice was rotated with respect to the other, so that the fuel channels were skewed with respect to the core axis. This skewed lattice does not solve any of the difficulties of a non-uniform lattice since the skew angle is dependent on the radius of the channel from the core axis and the fuel element spacing is tighter in the outer core regions than adjacent to the axis, which is the reverse of the desired channel spacing.

$D_2O$ reactor economics are strongly dependent on neutron economy. Studies also show that a moderate degree of flux flattening will, as a rule, decrease the cost of generated power. Flattening allows an increase in output from a core of given size and a corresponding decrease in the capital cost component of the Unit Energy Cost. The usual flattening schemes involve the reduction of reactivity in a central zone of the reactor either by the use of absorbing rods or bars, or by utilizing the fission product poisons in fuels with extended burnups. In either case, flattening is accomplished by extra parasitic absorption, the neutron economy suffers and there is a resultant decrease in average burnup. In terms of Unit Energy Cost, the reduced capital cost charge tends to be offset by the burnup penalty and the economic degree of flattening is given by the best balance between the two opposing factors.

If the burnup penalty could be decreased by reducing the purely wasteful absorption in nuclear poisons, an immediate economic improvement would result. One approach is a reactor design in which the resonance capture in U–238 is increased in the flattened zone to give the requisite decrease in buckling which at the same time, increases the conversion ratio and consequently the production of plutonium. If this increased plutonium content can then be burned in place, the burnup penalty is reduced and the saving would be reflected in a reduced cost of generated power.

The skewed lattice concept of the present invention offers just this possibility.

As opposed to the usual lattice arrangement where the fuel channels run parallel to the axis of the core, in a skewed lattice the channels are fixed at an angle to the core axis, in effect revolving the channel at one end face of the reactor about the central core axis. Various skewed lattice arrangements are possible, but in accordance with the present invention, the skewing arrangement is such that the pitch closes toward the reactor centre concentrating fuel at the centre both axially and radially. Further, the angle of the channel to the reactor end face can be held constant, easing end fitting manufacturing problems. The pitch at the end faces will be as open as in usual designs allowing normal access for feeders and fuel handling.

The maximum skew angle from a mechanical point of view is that angle at which two channels come tangentially into contact. For reactor physics reasons, the desirable angle of skew is not nearly as large. Fuel channels in near contact would produce severe neutron flux depressions which would be too extreme to produce the desired power flattening. There is an optimum spacing of fuel channels in a uniform core at which the reactivity is greatest. At larger than optimum pitches, the reactivity is less because somewhat too many neutrons are absorbed in the moderator. At less than optimum pitches, the reactivity is less because somewhat too many neutrons are absorbed in the fertile components of the fuel (e.g. U–238). The absorption of neutrons by fertile material produces new fissile material (e.g. Pu–239) but in a uniform lattice full advantage cannot be taken of this.

In operation with a bidirectional fuelling scheme in a skewed lattice, each fuel bundle on entering the reactor would start its irradiation at close to optimum pitch. As irradiation proceeds, the bundle would be pushed toward the reactor centre where the pitch is closer, artificially reducing its activity for flattening purposes and increasing its Pu production. Passing through the central region, the gradually widening pitch again increases its reactivity toward the maximum attainable at its stage of irradiation. In this way, the increased Pu production from the central region is used to increase the reactivity of the unflattened axial zone, increasing the possible burnup.

The axial flattening feature should be noted. The incentive to axial flattening is not as great as that for radial flattening, as the axial form factor is reasonably high without any special provisions, but incentive for a moderate increase in axial form factor does exist in large reactor sizes. This feature, inherent in the skew arrangement, provides an additional bonus of reactor efficiency.

Calculations based on a known core indicate a decrease in Unit Energy Cost of about 6% from that core. In the case chosen, this could be broken down to about 3% for radial flattening, about 1% for axial flattening and about 2% due to the increase in burnup over that given by a differential burnup flattening scheme with the same radial form factor. Assuming the differential burnup scheme has attained its equilibrium fuel schedule, the skewed lattice appears to have a net advantage over the differential burnup scheme of 0.1 mills/kwh. in a total unit energy cost of 3.2 mills/kwh. Additionally the skewed lattice will give flattening from the start of operation, a feature not inherent in the differential burn-up scheme.

The present invention provides a fuel channel lattice arrangement in which the fuel channels are skewed and in which the lattice is tighter in the central regions of the core than in the outer regions. This desirable arrangement of fuel channels is achieved with a non-symmetrical lattice arrangement wherein each of the fuel channels is located with reference to a uniform reference lattice and the skew angle of the particular fuel channel.

The present invention also provides a nuclear reactor fuel channel lattice for a right circular cylindrical nuclear reactor core having a central axis, comprising a plurality of fuel channels each having a reference position, each of said fuel channels being skewed at an angle with respect to a normal to an end of the reactor core, each said reference position being at the same radius from said central axis as the ends of said fuel channel, and being located on the bisector of the angle subtended by the ends of said fuel channel, said reference positions forming a uniform reference lattice whereby said fuel channels are non-uniformly spaced at any cross section through said reactor, and are more closely spaced radially and longitudinally at the centre of the reactor core than at the edges thereof.

Such a fuel channel lattice may be constructed with a uniform skew angle throughout the lattice or, alternatively, a plurality of discrete regions of uniform skew angles may be provided within the channel lattice. Thus, the mechanical difficulties in manufacturing end fittings for the fuel channels are overcome since these end fittings may all be of a constant skew angle or of a limited number of predetermined skew angles and fuel channels readily may be located for changing fuel elements.

In drawings which illustrate structures constructed in accordance with the present invention:

FIGURE 1a is a top plan view of a right circular cylindrical reactor core;

FIGURE 1b is a side elevation of a reactor core shown in FIGURE 1a;

FIGURE 2a is a diagram illustrating a reactor core with a constant skew angle $\alpha$;

Figure 3:
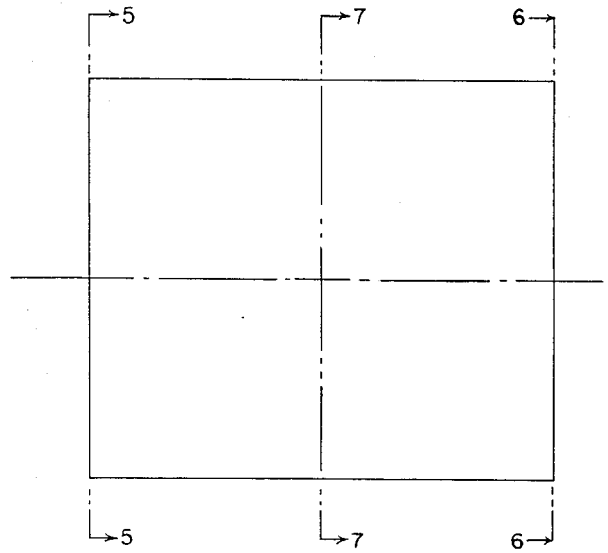
Figure 4:
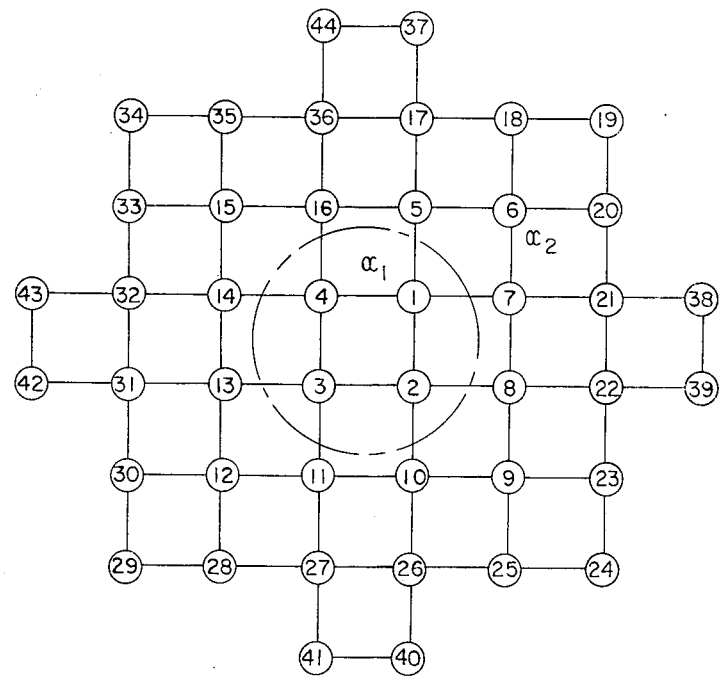
Figure 5:
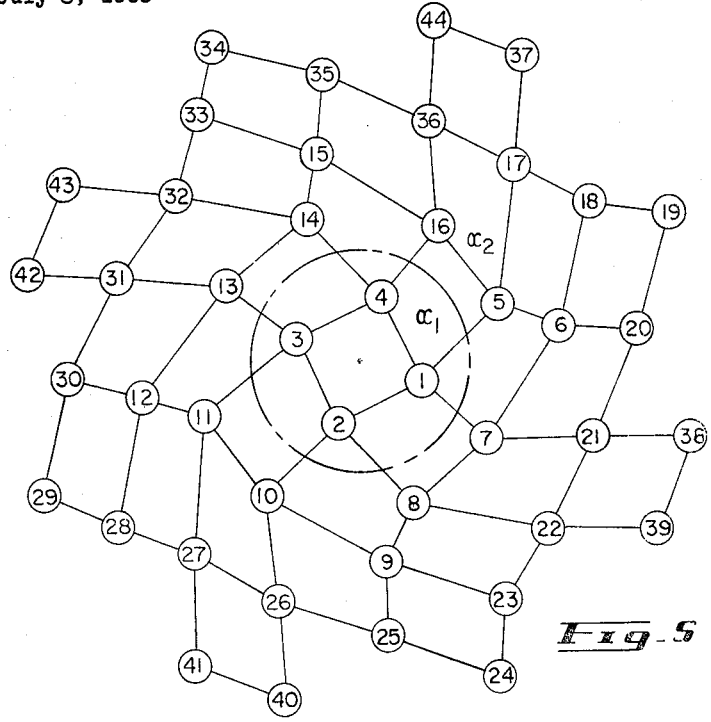
Figure 6:
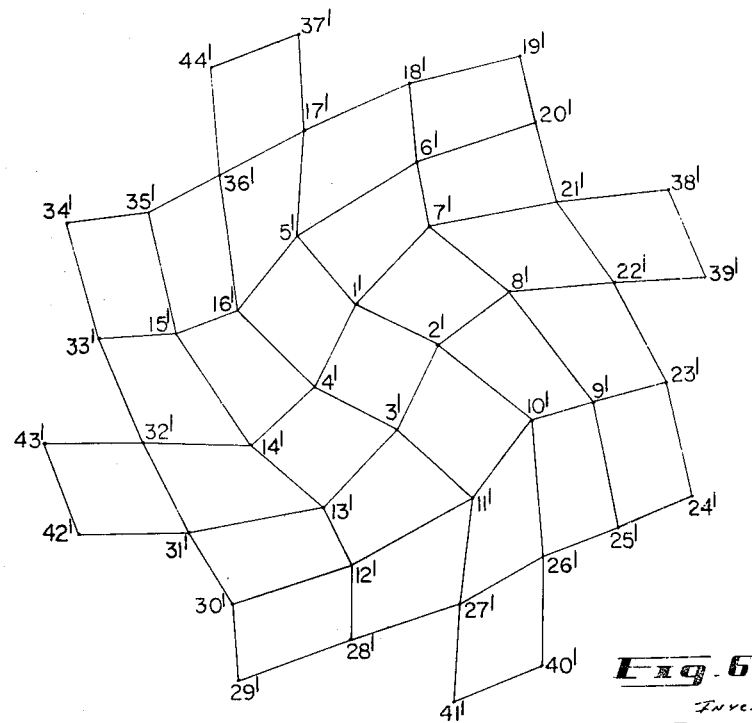
Figure 7:
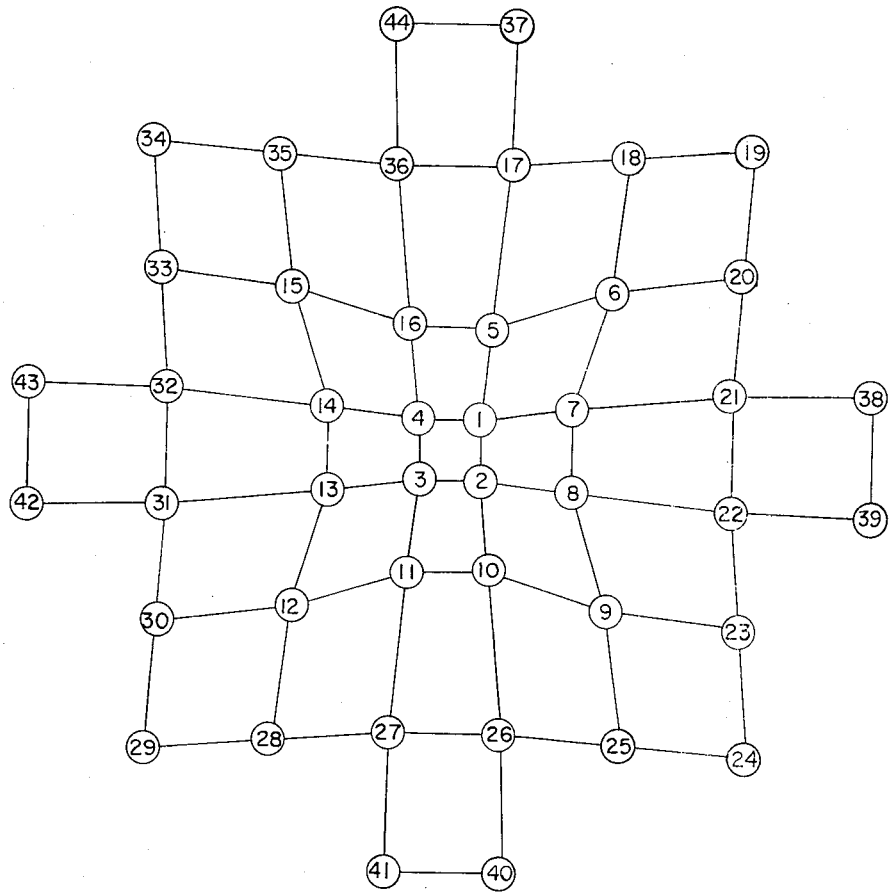
Figure 8:
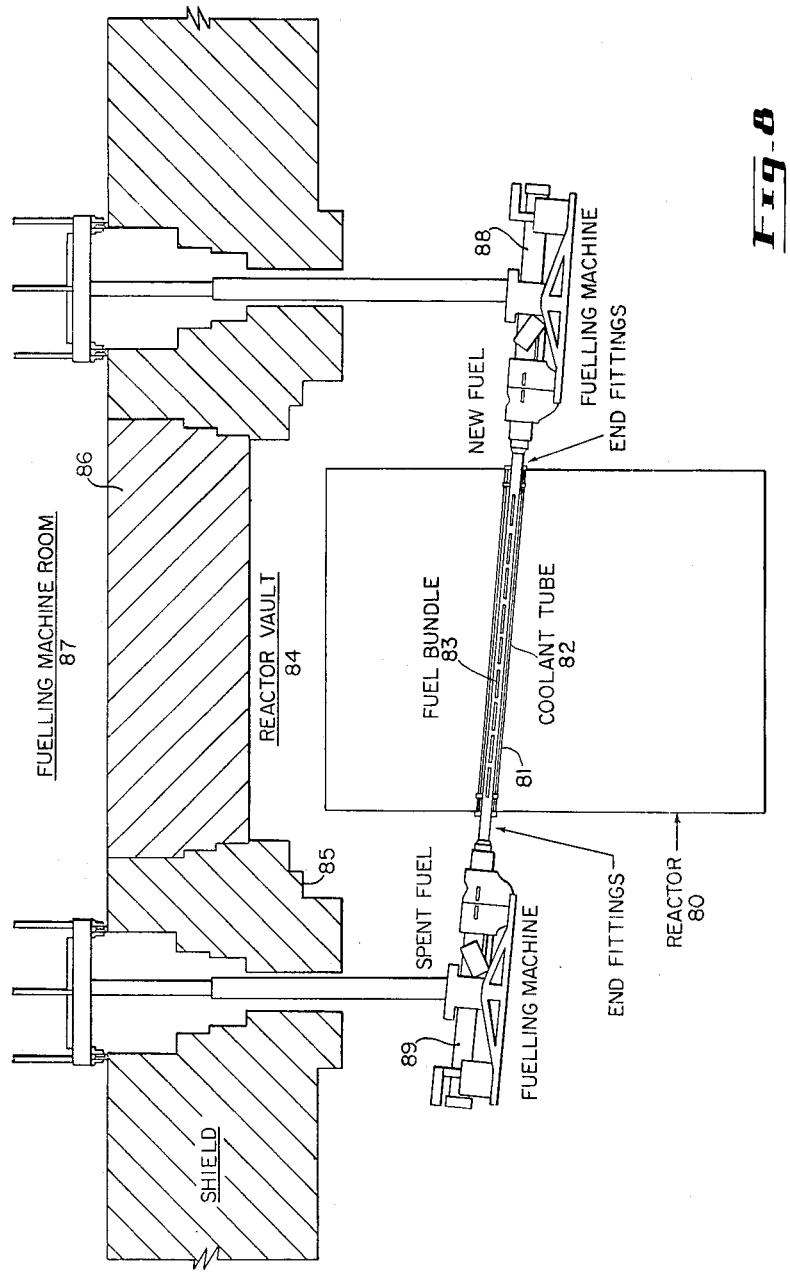

FIGURE 2b diagrammatically represents a nuclear reactor core divided into two angles, each having different skew angles;

FIGURE 3 is a side elevation of a nuclear reactor core showing the position of sections 5—5, 6—6 and 7—7;

FIGURE 4 illustrates a uniform reference lattice in accordance with the present invention;

FIGURE 5 is a section of the nuclear reactor core shown in FIGURE 3 on the line 5—5;

FIGURE 6 is a cross-section of the nuclear reactor core shown in FIGURE 3 on the line 6—6;

FIGURE 7 is a cross-section of the nuclear reactor core shown in FIGURE 3 on the line 7—7; and FIGURE 8 is a simplified cross-section of a nuclear reactor constructed in accordance with the present invention.

The layout of a skewed fuel channel is shown in FIGURES 1a and 1b. Hence, the channel runs from point A on one end of the core to point B on the other end. The channel runs at an angle $\alpha$ to a normal to an end of the core, hence the projected offset of end B from end A is the distance 2a. Ends A and B are both at radius R from the axis of the core. The channel can be located with respect to a reference position P which lies at radius R from the core axis on the bisector of the angle AOB. Hence, the skew of the channel can be specified by the angle $\alpha$ and the position of the channel can be located from the reference position P.

It is possible to lay out a lattice with only one skew angle $\alpha$ as in FIGURE 2a. By using two or perhaps three skew angles, as shown in FIGURE 2b, a somewhat improved lattice can be laid out when the number of channels is large.

FIGURE 4 illustrates a uniform reference lattice having 44 reference positions and, as shown, has two regions $\alpha 1$ and $\alpha 2$, wherein the skew angles are respectively $\alpha 1$ and $\alpha 2$. Each of the reference positions is numbered from 1 to 44 for convenience in referring to FIGURES 5, 6 and 7.

FIGURE 5 is a view of the reactor core shown in FIGURE 3, along the line 5—5 of a channel lattice based on the reference lattice shown in FIGURE 4. Each of the lattice positions is numbered from 1 to 44 and corresponds to the numbering of the reference lattice positions in FIGURE 4. Thus, position 1, shown in FIGURE 5, corresponds to reference lattice position 1 and the skew angle $\alpha 1$ is the skew angle of channels 1, 2, 3 and 4. Similarly, channels 5 to 44 inclusive have a skew angle $\alpha 2$, as shown.

FIGURE 6 is a view along the line 6—6 of FIGURE 3 and shows the position of the ends of the fuel channels which are remote from the ends shown in FIGURE 5. It will be appreciated that the shape of the lattice in FIGURE 6 is a mirror image of the lattice shown in FIGURE 5, but it will also be evident that a mirror image of FIGURE 5 with the channel positions numbered as shown would not accurately represent the channel positions on the section of FIGURE 6. By referring to FIGURES 5 and 6, it will be seen that at the top of the core, the channel number 1 is slightly below and to the right of the axis of the core and in the position shown in FIGURE 6, the lower end of channel 1 is above and slightly to the left of the axis of the core. It will also be noted, by comparing FIGURE 4, 5 and 6, that the reference position 1, as shown in FIGURE 4, is on the same radius as the positions of the upper and lower ends of the fuel channel 1 in FIGURES 5 and 6 and the reference position, as shown in FIGURE 4, lies on the bisector of the angle subtended by the ends of the fuel channel 1. Similarly, with each of the other reference positions 2 to 44 inclusive, the reference position is at the same radius as the ends of the fuel channel and lies on the bisector of the angle subtended by the ends of the fuel channels.

FIGURE 7 shows a cross-section on the line 7—7 of FIGURE 3 and clearly illustrates the maximum degree to which the channels bunch toward the centre of the core. It will be appreciated that this bunching occurs both axially as well as radially and gives exactly the desired concentration of fuel elements for most efficient operation of the nuclear reactor. Thus, it may be seen that a quite tight lattice pitch in the centre of the core can be obtained easily without the ends of the channels being as closely spaced.

FIGURE 8 is a schematic illustration in cross-section of a nuclear reactor using the skewed lattice of the present invention. The reactor 80 is shown with only a single fuel channel 81 for simplicity. The fuel channel 81 is surrounded by a coolant tube 82 and contains a plurality of discrete fuel bundles 83. As is usual, the reactor is positioned in a reactor vault 84, which is shielded by means of the shield 85, containing a plug 86, which may be removed when it is necessary to have access to the reactor 80. As shown in FIGURE 8, a fuelling machine room 87 is provided above the reactor vault 84 and contains the control equipment for the fuelling machines 88 and 89. New fuel bundles are being inserted into the fuel channel by the fuelling machine 88 and the spent fuel is being removed from the fuel channel by the fuelling machine 89. Both fuelling machines 88 and 89 are capable of inserting or removing fuel. Which operation a machine does depends on which fuel channel is selected. By properly timing the insertion and removal of fuel from the reactor, a degree of radial flattening of the neutron flux can be obtained with the increase in efficiency previously mentioned. Proper timing of fuel changes is also a means of long term reactivity control.

The fuelling machines 88 and 89 shown in FIGURE 8 are positioned in accordance with the uniform reference lattice and the skew angle of the particular fuel channel in which the fuel is being changed. Thus, a minimum number of different end fittings are required and appreciable advantages in reactor performance are obtained.

I claim:

1. A nuclear reactor fuel channel lattice for a right circular cylindrical nuclear reactor core having a central axis, comprising a plurality of fuel channels each having a reference position, each of said fuel channels being skewed at an angle with respect to a normal to an end of the reactor core, each said reference position being at the same radius from said central axis as the ends of said fuel channel, and being located on the bisector of the angle subtended by the ends of said fuel channel, said reference positions forming a uniform reference lattice whereby said fuel channels are non-uniformly spaced at any cross section through said reactor, and are more closely spaced radially and longitudinally at the center of the reactor core than at the edges thereof.

2. A reactor lattice as claimed in claim 1 wherein all of said fuel channels are skewed at the same angle.

3. A reactor lattice as claimed in claim 1 wherein said reference lattice is divided into regions, fuel channels in each region being skewed at the same angle, the skew angle for each region being different.

4. A reactor lattice as claimed in claim 3 wherein said regions are concentric about said axis.

5. A reactor lattice as claimed in claim 4 wherein said lattice is divided into two regions.

6. A reactor lattice as claimed in claim 5 wherein the skew angle of the outer region is greater than the skew angle of the inner region.

7. A nuclear reactor having a right circular cylindrical core with a central axis, and containing a fuel channel lattice, comprising a plurality of fuel channels each having a reference position, each of said fuel channels being skewed at an angle with respect to a normal to an end of the reactor core, each said reference position being at the same radius from said central axis as the ends of said fuel channel, and being located on the bisector of the angle subtended by the ends of said fuel channel, said reference positions forming a uniform reference lattice whereby said fuel channels are non-uniformly spaced at any cross section through said reactor, and are more closely spaced radially and longitudinally at the centre of the reactor core than at the edges thereof.

8. A nuclear reactor as claimed in claim 7 wherein all of said fuel channels are skewed at the same angle.

9. A nuclear reactor as claimed in claim 7 wherein said reference lattice is divided into regions, fuel channels in each region being skewed at the same angle, the skew angle for each region being different.

10. A nuclear reactor as claimed in claim 9 wherein said regions are concentric about said axis.

11. A nuclear reactor as claimed in claim 10 wherein said lattice is divided into two regions.

12. A nuclear reactor as claimed in claim 11 wherein the skew angle of the outer region is greater than the skew angle of the inner region.

13. A nuclear reactor as claimed in claim 7 and including first and second fuelling machines, said first fuelling machine being adapted to be positioned to insert new fuel into a selected fuel channel of said reactor lattice, and said second fuelling machine being adapted to remove fuel from a selected channel of said reactor lattice, the insertion and removal of fuel from said selected fuel channel being so timed to assist in achieving a radial flattening of the neutron flux in the reactor lattice as well as a long term reactivity control.

References Cited by the Examiner
UNITED STATES PATENTS

| 2,725,993 | 12/55 | Smith | 176—30 |
| 2,774,730 | 12/56 | Young | 176—42 |
| 2,853,625 | 9/58 | Ohlinger | 176—32 |
| 3,005,765 | 10/61 | Marshall | 176—58 |

FOREIGN PATENTS

| 1,191,715 | 4/59 | France. |
| 1,244,002 | 9/60 | France. |

OTHER REFERENCES

Benzler: German application No. 1,083,943, printed June 23, 1960.

CARL D. QUARFORTH, *Primary Examiner.*

REUBEN EPSTEIN, *Examiner.*